(12) United States Patent
Van Phan et al.

(10) Patent No.: US 12,267,894 B2
(45) Date of Patent: Apr. 1, 2025

(54) SIDELINK-BASED UE RELAYING FOR EFFICIENT SUPPORT OF TRACKING APPLICATIONS

(71) Applicant: Nokia Technologies Oy, Espoo (FI)

(72) Inventors: Vinh Van Phan, Oulu (FI); Ling Yu, Kauniainen (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 417 days.

(21) Appl. No.: 17/753,801

(22) PCT Filed: Sep. 14, 2020

(86) PCT No.: PCT/IB2020/058530
§ 371 (c)(1),
(2) Date: Mar. 15, 2022

(87) PCT Pub. No.: WO2021/059077
PCT Pub. Date: Apr. 1, 2021

(65) Prior Publication Data
US 2022/0346162 A1 Oct. 27, 2022

Related U.S. Application Data

(60) Provisional application No. 62/904,801, filed on Sep. 24, 2019.

(51) Int. Cl.
*H04W 76/14* (2018.01)
*H04W 8/00* (2009.01)
*H04W 88/04* (2009.01)

(52) U.S. Cl.
CPC .......... *H04W 76/14* (2018.02); *H04W 8/005* (2013.01); *H04W 88/04* (2013.01)

(58) Field of Classification Search
None
See application file for complete search history.

(56) References Cited

U.S. PATENT DOCUMENTS

| | | | | |
|---|---|---|---|---|
| 2015/0215903 | A1* | 7/2015 | Zhao | H04W 8/005 370/329 |
| 2016/0295565 | A1* | 10/2016 | Kim | H04L 5/0053 |
| 2018/0084478 | A1 | 3/2018 | Lee et al. | |

OTHER PUBLICATIONS

"New WID on enhanced Relays for Energy efficiency and Extensive Coverage", 3GPP TSG-SA WG1 Meeting #86, S1-191149, Agenda Item: 5, KPN, May 6-10, 2019, 3 pages.

(Continued)

*Primary Examiner* — Hong Shao
(74) *Attorney, Agent, or Firm* — Lippes Mathias LLP

(57) ABSTRACT

Systems, methods, apparatuses, and computer program products for sidelink (SL) based multi-hop UE relaying, for example, to support tracking applications are provided. One method may include determining, at a user equipment (UE), to which tier of a sidelink (SL) based multi-hop user equipment (UE) relaying the user equipment (UE) belongs. The method may also include determining at least a relaying mode and arrangement of transmit and receive occasions for sidelink (SL) transmission and reception in dependence on the determined tier that the user equipment (UE) belongs, and performing, on the determined transmit and receive occasions, transmit and receive operations for the sidelink (SL) based multi-hop user equipment (UE) relaying based on the determined relaying mode and arrangement.

18 Claims, 4 Drawing Sheets

(56) References Cited

OTHER PUBLICATIONS

"FS_REFEC—Potential new requirements for container use case", 3GPP TSG-SA WG1 Meeting #86, S1-191319, Agenda Item: 8.6, Novamint, May 6-10, 2019, 5 pages.

"3rd Generation Partnership Project; Technical Specification Group Services and System Aspects; enhanced Relays for Energy Efficiency and Extensive Coverage; Stage 1 (Release 17)", 3GPP TR 22.866, V0.3.0, May 2019, pp. 1-34.

Wu et al., "Integrated Cellular and Ad Hoc Relaying Systems: iCAR", IEEE Journal on Selected Areas in Communications, vol. 19, No. 10, Oct. 2001, pp. 2105-2115.

Asadi et al., "A Survey on Device-to-Device Communication in Cellular Networks", IEEE Communications Surveys & Tutorials, vol. 16, No. 4, Fourth Quarter 2014, pp. 1801-1819.

"3rd Generation Partnership Project; Technical Specification Group Radio Access Network; Study on further enhancements to LTE Device to Device (D2D), User Equipment (UE) to network relays for Internet of Things (IoT) and wearables; (Release 15)", 3GPP TR 36.746, V15.1.1, Apr. 2018, pp. 1-55.

International Search Report and Written Opinion received for corresponding Patent Cooperation Treaty Application No. PCT/IB2020/058530, dated Nov. 23, 2020, 19 pages.

"Considerations on 5G relay requirements", 3GPP TSG RAN ad hoc, RPa160054, Agenda Item: 5, Qualcomm Incorporated, Jan. 28-29, 2016, 4 pages.

Kulkarni et al., "An address-light, integrated MAC and routing protocol for wireless sensor networks", IEEE/ACM Transactions on Networking, vol. 14, No. 4, Aug. 2006, pp. 793-806.

"IEEE 802.11", Wikipedia, Retrieved on Mar. 7, 2022, Webpage available at : https://en.wikipedia.org/wiki/IEEE_802.11.

* cited by examiner

SIDELINK-BASED UE RELAYING FOR EFFICIENT SUPPORT OF TRACKING APPLICATIONS

RELATED APPLICATION

This application claims priority to PCT Application No. PCT/IB2020/058530, filed on Sep. 14, 2020, which claims priority to U.S. Provisional Application No. 62/904,801, filed on Sep. 24, 2019, each of which is incorporated herein by reference in its entirety.

FIELD

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to using UE relaying, e.g., to support tracking applications.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. 5G is mostly built on a new radio (NR), but a 5G (or NG) network can also build on E-UTRA radio. It is estimated that NR provides bitrates on the order of 10-20 Gbit/s or higher, and can support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G, the nodes that can provide radio access functionality to a user equipment (i.e., similar to Node B in UTRAN or eNB in LTE) may be named gNB when built on NR radio and may be named NG-eNB when built on E-UTRA radio.

SUMMARY

An embodiment may be directed to a method that may include a UE determining to which tier of a SL based multi-hop UE relaying the UE belongs. The method may also include determining at least a relaying mode and arrangement of transmit and receive occasions for SL transmission and reception in dependence on the determined tier that the UE belongs to. The method may then include performing, on the determined transmit and receive occasions, transmit and receive operations for the SL based multi-hop UE relaying based on the determined relaying mode and arrangement.

Another embodiment may be directed to an apparatus including at least one processor and at least one memory comprising computer program code. The at least one memory and computer program code may be configured, with the at least one processor, to cause the apparatus at least to determine which tier of a SL based multi-hop UE relaying the apparatus belongs to, determine at least a relaying mode and arrangement of transmit and receive occasions for SL transmission and reception in dependence on the determined tier that the apparatus belongs to, and perform, on the determined transmit and receive occasions, transmit and receive operations for the SL based multi-hop UE relaying based on the determined relaying mode and arrangement.

Another embodiment may be directed to an apparatus including means for determining which tier of a SL based multi-hop UE relaying the apparatus belongs to, means for determining at least a relaying mode and arrangement of transmit and receive occasions for SL transmission and reception in dependence on the determined tier that the apparatus belongs to, and means for performing, on the determined transmit and receive occasions, transmit and receive operations for the SL based multi-hop UE relaying based on the determined relaying mode and arrangement.

According to a variant, the sidelink (SL) based multi-hop user equipment (UE) relaying comprises a multi-hop relaying of data between at least one source user equipment (UE) and at least one destination user equipment (UE) or between at least one source user equipment (UE) and at least one serving network via at least one relaying user equipment (UE) for at least one targeted service and the tier is corresponding to a specific hop of the sidelink (SL) based multi-hop user equipment (UE) relaying.

In a variant, the method may further include, or the apparatus may be controlled to, acting as a synchronization source for other UEs in the SL based multi-hop UE relaying in dependence on the determined tier that the UE belongs to. In a variant, the method may also include, or the apparatus may be controlled to, periodically send a control message on a predefined SL channel configured for the SL based UE relaying, where the SL control message may indicate the tier that the UE or apparatus belongs to and the relaying mode of the SL based UE relaying.

In a variant, the determining of which tier the UE belongs to may further include discovering whether there are other UEs of the SL based multi-hop UE relaying in proximity of the UE and determining which tier the other UEs belong to.

In a variant, when the UE is in a coverage area of a serving network, the method may include, or the apparatus may be controlled to, connect to the serving network and an application server for the SL based multi-hop UE relaying, determine that the UE or apparatus belongs to a lowest tier (e.g., Tier_0) of the SL based UE relaying, and determine the relaying mode and arrangement of transmit and receive occasions for SL transmission as configured by the serving network or the application server.

In another variant, the UE or apparatus may initially try to first discover a relaying UE of the SL based multi-hop UE relaying in its proximity, instead of discovering a serving network. When the UE or apparatus discovers a relaying UE of the SL based multi-hop UE relaying in its proximity, the UE or apparatus may act as a higher tier (e.g., Tier_1) UE of the SL based multi-hop UE relaying in dependence on the tier of the UE(s) discovered. When the UE or apparatus does not discover any relaying UE of the SL based multi-hop UE relaying in its proximity, the UE or apparatus may start to discover and select a serving network and then to act as a lowest tier (e.g., Tier_0) UE of the SL based multi-hop UE relaying.

In another variant, the serving network, upon receiving a service request from a server or a UE of the tracking application, where the service request may indicate a targeted service area or a location information of the requesting UE, may select and/or configure one or more UEs in the targeted service area or in the proximity of the requesting UE to act as a lowest tier (e.g., Tier_0) UE(s) for the requesting UE. In a variant, the serving network may indicate to the requesting UE or the requesting server that a lowest tier (e.g., Tier_0) UE of the SL based multi-hop UE relaying is provided. In a variant, the requesting UE may discover the lowest tier (Tier_0) UE(s) and deactivate its cellular access capability towards the serving network in case one or more UE(s) of the SL based multi-hop UE relaying are discovered, and act as a higher tier (Tier_1) UE of the SL based multi-hop UE relaying compared to the lowest tier of the one or more UE(s) discovered. In a variant, when the serving network provides also the resource pool configurations for the relaying system via the selected UEs acting as lowest tier (Tier_0) UEs, the serving network may select and/or configure RM, in addition to setting SFN, HFN and other timing parameters to the selected UEs.

Another embodiment may be directed to a method that may include receiving a service request from a user equipment (UE) or server, where the service request indicates a targeted service area or a location information of the user equipment (UE) for a SL based multi-hop UE relaying. The method may also include selecting and/or configuring one or more user equipment (UEs) in the targeted service area or in proximity of the user equipment (UE) to act as a lowest tier user equipment (UEs) of the sidelink (SL) based multi-hop relaying for the user equipment (UE).

Another embodiment may be directed to an apparatus including at least one processor and at least one memory comprising computer program code. The at least one memory and computer program code may be configured, with the at least one processor, to cause the apparatus at least to receive a service request from a user equipment (UE) or server, where the service request indicates a targeted service area or a location information of the user equipment (UE) for a SL based multi-hop UE relaying, and to select and/or configuring one or more user equipment (UEs) in the targeted service area or in proximity of the user equipment (UE) to act as a lowest tier user equipment (UEs) of the sidelink (SL) based multi-hop relaying for the user equipment (UE).

Another embodiment may be directed to an apparatus that may include means for receiving a service request from a user equipment (UE) or server, wherein the service request indicates a targeted service area or a location information of the user equipment (UE) for a SL based multi-hop UE relaying, and means for selecting and/or configuring one or more user equipment (UEs) in the targeted service area or in proximity of the user equipment (UE) to act as a lowest tier user equipment (UEs) of the sidelink (SL) based multi-hop relaying for the user equipment (UE).

In a variant, the method may include, or the apparatus may be controlled to, indicate to the user equipment (UE) or the server that the lowest tier user equipment (UEs) of the sidelink (SL) based relaying is provided for the user equipment (UE).

In a variant, the method may include, or the apparatus may be controlled to, select and/or configure relaying mode (RM), setting system frame number (SFN) and hyper frame number (HFN) and other timing parameters to the selected user equipment (UEs).

BRIEF DESCRIPTION OF THE DRAWINGS

For proper understanding of example embodiments, reference should be made to the accompanying drawings, wherein.

DETAILED DESCRIPTION

Figure 1:
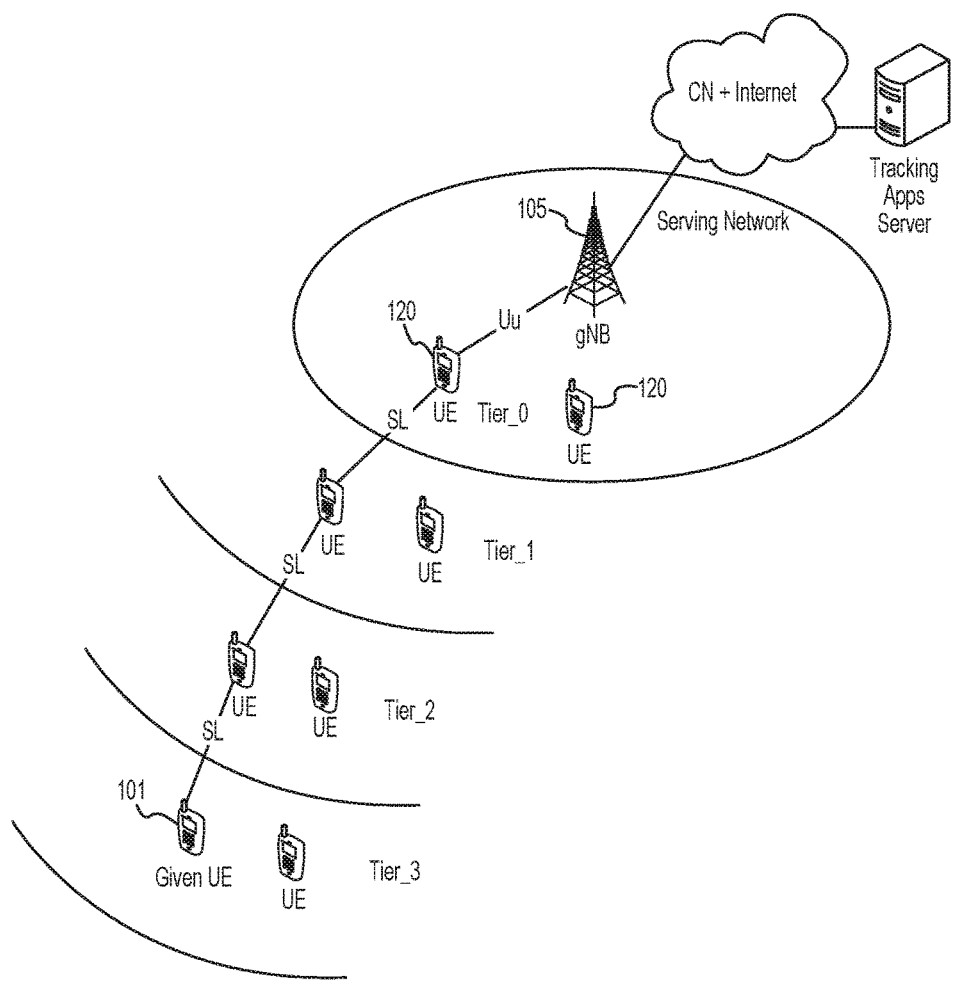
FIG. 1 illustrates an example SL based multi-hop UE relaying system, according to an embodiment.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for UE relaying, for example to support tracking applications, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or procedures discussed below may be performed in a different order and/or concurrently with each other. Furthermore, if desired, one or more of the described functions or procedures may be optional or may be combined. As such, the following description should be considered as merely illustrative of the principles and teachings of certain example embodiments, and not in limitation thereof.

Certain embodiments described herein may relate to providing efficient support for enhanced relays for energy efficiency and extensive coverage (REFEC), which may be targeted for 3GPP Release-17 and beyond. For example, some embodiments may be directed to supporting tracking applications. Some example use cases of tracking applications are in the areas of public safety and industrial supply chain management. For instance, the monitoring and tracking of shipping containers is a key part of supply chain management as it allows for complete traceability and optimization of the movement and storage of goods. Further, it is expected that 5G systems (and beyond) can help support the tracking of such containers in an efficient manner.

In the container use case, tracking applications may be implemented by equipping each container with a battery powered IoT UE or tracking device that includes a 5G communication module capable of communicating with a 5G or other type of communications system. The 5G system may interface with a container tracking management system or tracking application server that may be configured to setup a travel plan for each container. The containers may also possibly be provided with one or more sensors for monitoring the environment in and around the container. As the IoT UE is battery powered, it would be desirable for the IoT UE to be able to operate for the lifetime of a container without the need for the battery to be replaced.

It should be noted that example embodiments are not limited to the container use case discussed above. For example, some embodiments may be useful in public safety applications or any other applications that may utilize UE relaying.

An important feature of tracking applications is the reachability of an individual tracking device (e.g., IoT UE). As an example, a tracking device may be in a container buried under many layers of containers or on a human-being or object buried under layers of rubble in collapsed buildings in an area affected by a disaster. The reachability of a tracking device, e.g., by means of radio communications, may be defined as a possibility for a tracking application server to ping the tracking device and/or the tracking device to send a stay-alive message to the server on a regular basis via a serving network, especially when the tracking device is out of direct radio coverage of the serving network.

Sidelink (SL) based multi-hop UE relaying is considered an effective means for providing reachability to out-of-coverage UEs, e.g., in order to support tracking applications. FIG. 1 illustrates an example system diagram of SL based multi-hop UE relaying that may be used to support tracking applications.

As illustrated in the example of FIG. 1, a given UE 101 would need to use N hops over SL plus 1 hop over Uu to reach the base station (BS) or gNB 105. In the example of FIG. 1, N=3, but any number of hops may be implemented according to other embodiments. These N+1 hops correspond to N+1 tiers, which are indexed from 0 to N, as shown in FIG. 1. The UEs 120 in direct coverage of the serving network are considered as Tier_0 UEs.

One challenge for supporting targeted tracking applications is a result of the low-power and high energy-efficiency requirements associated with individual tracking devices or UEs. In other words, the mobile battery of individual UEs should be able to last for months or even years without a recharging. Thus, a straightforward and effective solution that produces minimized protocol overhead and therefore minimum power consumption for UEs is a key goal.

Conventional solutions for integrated cellular ad-hoc relays (iCAR), including the enhancements to LTE Device-to-Device or UE-to-Network relays for IoT and wearables, suggest that all UEs in UE-to-Network relays are considered as being in an enhanced or extended coverage of the serving cellular network and therefore can be reached by means of conventional cellular location-tracking procedures, such as location register, location update and paging. This implies that all reachable UEs are to be maintained in a valid UE state of the serving cellular network, e.g., idle, inactive or connected state. However, maintaining UEs in any of these states causes notable overhead and power consumption for individual UEs. It is noted that even for a regular individual UE with direct cellular access in idle or inactive state the battery life would run out within days or weeks, just from maintaining that cellular state (e.g., due to periodical cell search, cell selection and re-selection, location register and update).

Certain embodiments, taking into account the end-to-end (E2E) aspects of tracking applications, can provide a solution that requires as little network control and enhancement as possible. An embodiment is based on considering the UEs that are located in tiers above Tier_0 as out-of-coverage UEs, so as to avoid a need for cellular state management for those UEs. As a result, the reachability of those UEs above Tier_0 now does not rely on the location tracking services of the serving cellular network on C-plane but is shifted to U-plane with the application server and application-aware network function incorporated. Thus, example embodiments may be applied for any suitable serving network of the last hop or Tier_0, such as cellular or satellite or even fixed access networks.

According to certain embodiments, UE(s) may transmit a small stay-alive message to the tracking server periodically per T_app or in response to a ping message received from the application server. The application may be considered as near real-time, meaning that it is not really delay-sensitive (delays on range of seconds may be tolerable). In certain embodiments, a UE may be preconfigured for out-of-coverage operation over SL, transmit (Tx) and receive (Rx), towards other UE(s) and the application server for the tracking application of interest without a need for a connection setup. SL is based on one-to-many broadcast without L1/L2 feedback control, for example, as applied for LTE and NR SL used for Public Safety or vehicle-to-everything (V2X) for examples.

In an embodiment, UE(s) in Tier_k may communicate with UE(s) in Tier_(k−1) or Tier_(k+1) only, where k>=1. Further, in an embodiment, UE(s) in Tier_0 . . . (N−1) may act as SL synchronization sources for UE(s) in an immediately higher tier Tier_1 . . . N by sending SL synchronization signals with timing inherited from Tier_0 (provided by the serving network for example). SL-based multi-hop UE relaying is on L3 and above, i.e., a store-and-forward multi-hop relay, with a maximum of N hops or (N+1) tiers, indexed from 0 to N: Tier_0, . . . , Tier_N. N may be preconfigured to the UEs as application-specific. In this regard, security is due to the application, and N may be a fixed or adaptive parameter.

As will be discussed in more detail below, some embodiments are directed to methods for SL based multi-hop UE relaying to efficiently support tracking applications. In an embodiment, a UE may determine which tier of the SL based multi-hop UE relaying for the tracking application of interest (Tier_k) that the UE belongs to. For example, in the example of FIG. 1, the UE 101 would determine that it belongs to Tier_3. In one embodiment, SL control information (SCI) sent on physical sidelink control channel (PSCCH) may be used for both discovery and scheduling assignment. This means there is no need to have exclusive discovery channels and related procedures. The SCI, when being used for discovery and not scheduling assignment, indicates at least one of the tier the transmitting UE belongs to (Tier_k), the system frame number (SFN) and hyper frame number (HFN), the relaying mode (RM) and other system information (e.g., a preconfigured unique ID of the common UE group or tracking application representing the SL based multi-hop UE relaying system and system parameters such as timing-related parameters considered below for example). These may be inherited from Tier_0, which can be controlled by the serving network, or preconfigured by the application, for example. SFN and HFN are adopted for system frame (SF) level timing and relaying synchronization, whereas there can be more than one predefined option for RM which can be either configured and controlled by the serving network to UE in Tier_0 or preconfigured by the application layer across all tiers (FIG. 3 discussed below provides examples of such RM options). It is noted that when the SCI sent on PSCCH is used for different purposes, such as the discovery considered in the SL based multi-hop UE relaying, the SL resource sensing or the SL scheduling assignment specified in the current 3GPP standards, the SCI may have different corresponding formats (and information elements). Therefore, there is a need for an indication specifying the corresponding format of each SCI instance. This indication can be realized, for example, by either having an explicit information element included in each SCI or having an exclusive resource allocation (resource pool) for each corresponding format of SCI.

A reason for adopting SFN, HSN and RM is to explore the near-real-time nature of the tracking applications of interest which tolerates E2E delays on the range of seconds. In the following, the duration of a system frame (SF) may be denoted as D_sf and the duration of a hyper frame (HF) may be denoted as D_hf (D_sf=10 ms and D_hf=2056*D_sf for a practical example).

As introduced above, a UE in coverage of the serving network belongs to Tier_0. In an embodiment, the network coverage may also include enhanced or extended coverage, meaning that UEs in Tier_0 may be allowed to form an additional relay network which is maintained by the serving network, similar to conventional iCAR or D2D based L2 relaying, for example. In this regard, UEs in Tier_0 may need extended capability at least in terms of cellular access and additional power consumption, as compared to UEs in other tiers.

According to some embodiments, UE(s) in out-of-coverage situation, which has no associated tier, may periodically monitor to acquire SL synchronization and receive a control channel, such as for example, PSCCH, over preconfigured resource pool(s) per a preconfigured first time period, denoted as T1, T1=n1*D_sf, where n1 is a preconfigured positive integer for example. This PSCCH monitoring is in order for the UE to discover at least that there are other UE(s) in proximity and which tier(s) the discovered other UE(s) belong(s) to and thereby determine which tier the UE belongs to as follows. For example, in case the UE does not discover any other UE, then the UE does not associate itself to any tier and waits until the next T1 period to repeat the procedure of monitoring to acquire SL synchronization and receiving PSCCH over the preconfigured resource pools. In case the UE discovers one or more UE(s), then the UE associates itself to Tier_k if at least one of the discovered UE(s) belong to Tier_(k−1) and the rest from either Tier_k or above (e.g., Tier_(k+1), Tier_(k+2), etc.).

In an embodiment, after determining which tier the UE belongs to (i.e., Tier_k), the UE may derive the corresponding Tx and Rx pools for SL transmission and reception in Tier_k, out of the preconfigured resource pools for out-of-coverage operation coupled with inherited SFN, HFN and RM. In certain embodiments, the UE may then start to act as a SL synchronization source for other UE(s) in Tier_(k+1) if k<N by sending SL synchronization signal and sending at least PSCCH for discovery periodically per T1 in the corresponding Tx pool of Tier_k. The contents of SCI sent on PSCCH for discovery may include the determined Tier_k, and the inherited SFN, HSF and RM, as mentioned above. According to an embodiment, the UE may then monitor to receive at least PSCCH for discovery sent from Tier_(k−1) in the corresponding Rx pool of Tier_k periodically per T2, e.g., T2=n2*T1 (n2 is a preconfigured positive integer), to check and make sure there are still other UE(s) in Tier_(k−1) in proximity and thereby keep the current association with Tier_k. In case the UE discovers there is no other UE in Tier_(k−1), the UE may be allowed to reconfirm that again m times in next available occasions at T2+T1 . . . T2+m*T1 (m<n2) before resetting itself to the state of having no associated tier and returning to the procedure of monitoring to acquire SL synchronization and receiving PSCCH over the preconfigured resource pool(s).

According to some embodiments, the UE may be configured to adapt SL operation, Tx and/or Rx, for the application of interest as well as relaying for other UEs, depending on which tier the UE is belonging to (i.e., Tier_k), and other preconfigured system information, as inherited from Tier_0 for network-controlled information or preconfigured for application specific information such as T_app common across all tiers. This replaying operation may be based on an effective store-and-forward scheme, considering impacts of SL based multi-hop relaying, e.g., the higher the tier the longer the data-forwarding latency, for supporting the tracking application of interest (characterized as near real-time as mentioned above). In an embodiment, the UE may determine the arrangement of Tx and Rx occasions and resources corresponding to Tier_k and RM, as shown in FIG. 4 for examples. According to one embodiment, the UE, on a Tx occasion, may send data towards Tier_(k−1) and/or Tier_(k+1). The data may include the UE's own data and relayed data in a concatenation of individual data packets from/to individual UEs, and the packet header of each data packet may indicate source/destination (SRD/DST) address and tier number of the originating/terminating UE. Further, in an embodiment, the UE, on a Rx occasion, may receive data from Tier_(k−1) and/or Tier_(k+1). The UE, based on the received data, may filter out and terminate its own data which can be new data from the server relayed by Tier_(k−1) to the UE and/or old data the UE transmitted in the previous Tx occasion to Tier_(k−1) and/or Tier_(k+1) for relaying. The possibility of hearing back the previously transmitted old data of the UE in the next Rx occasion, as expected by the UE, allows the UE to check whether the previous Tx was successful or not and, if not, the UE may retransmit some part of the old data in the next Tx occasion. Additionally, based on the received data, the UE may filter out and store other data for relaying in the next Tx occasion. For example, the UE may drop redundant data, as the UE may receive the relayed data from multiple UEs in Tier_(k−1) and/or Tier_(k+1), and may form its own data to be transmitted in the next Tx occasion for relaying.

Figure 2:
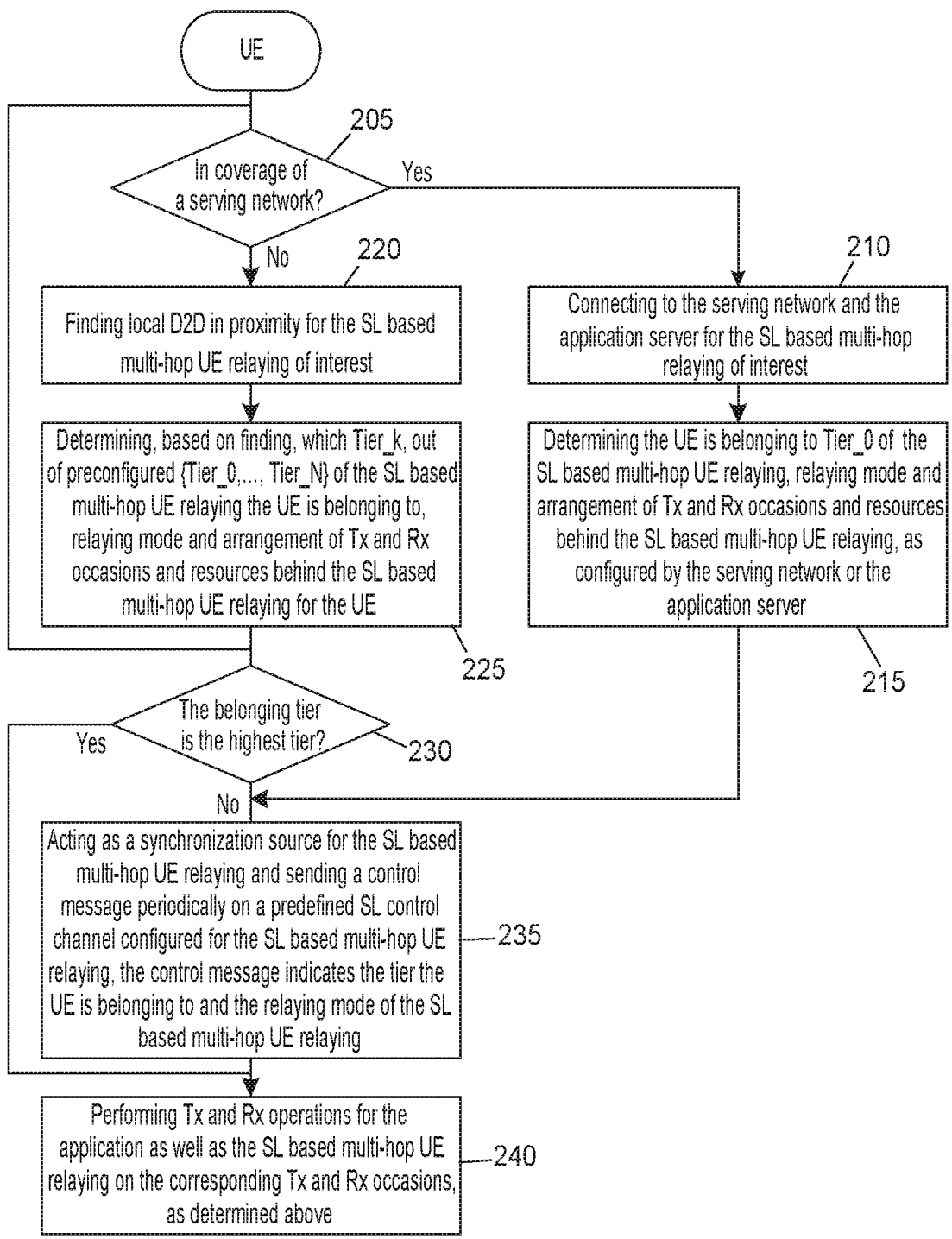
FIG. 2 illustrates an example flow diagram of a method, according to one embodiment.

FIG. 2 illustrates an example flow diagram of a method of UE operation in SL based multi-hop relaying arrangement, according to some embodiments. In certain example embodiments, the flow diagram of FIG. 2 may be performed by a network entity or network node configured for communication with a communications system, such as LTE or 5G NR. For instance, in some example embodiments, the method of FIG. 2 may be performed by a UE, such as an IoT UE, mobile station, and/or tracking device.

As illustrated in the example of FIG. 2, the method may include, at 205, determining whether the UE is in coverage of a serving network (e.g., 5G or LTE network). If it is determined that the UE is in coverage of a serving network, then the method may include, at 210, connecting to the serving network and the application server for the SL based multi-hop relaying of interest and, at 215, determining that the UE belongs to Tier_0 of the SL based multi-hop UE relaying, and determining at least one of a relaying mode, arrangement of Tx and Rx occasions depending on the determined tier, and resources behind the SL based multi-hop UE relaying, as configured by the serving network or the application server. The method may then proceed to procedure 235, as discussed below.

Alternatively, if it is determined that the UE is not in coverage of a serving network at 205, then the method may include, at 220, finding other local D2D UE in proximity of the SL based multi-hop UE relaying of interest. Then, based on finding other D2D UE in proximity, the method may include, at 225, determining which tier (Tier_k) out of a plurality of preconfigured tiers 0 to N (Tier_0, . . . , Tier_N) of the SL based multi-hop relaying the UE belongs to, as well as determining the relaying mode and arrangement of Tx and Rx occasions and resources behind the SL based multi-hop UE relaying for the UE.

If the UE does not discover any other D2D UEs in proximity, then the method may return to repeat procedure 205. Otherwise, after determining the tier that the UE belongs to (Tier_k), the method may include, at 230, determining whether the tier that the UE belongs to is the highest tier. If it is determined at 230 that the tier that the UE belongs to is not the highest tier, then the method may include, at 235, acting as a synchronization source for the SL based multi-hop UE relaying and sending a control message periodically on a predefined SL control channel configured for the SL based multi-hop UE relaying. In an embodiment, the control message may indicate at least one of the tier the UE belongs to and the relaying mode of the SL based multi-hop UE relaying, and timing parameters such as SFN and HFN as inherited from Tier_(k−1). The method may then include, at 240, performing Tx and Rx operations for the application as well as the SL based multi-hop UE relaying on the corresponding Tx and Rx occasions, as determined above.

If it is determined at 230 that the tier that the UE belongs to is the highest tier, then the method may proceed directly to procedure 240 to perform Tx and Rx operations for the application as well as the SL based multi-hop UE relaying on the corresponding Tx and Rx occasions, as determined above.

Figure 3:
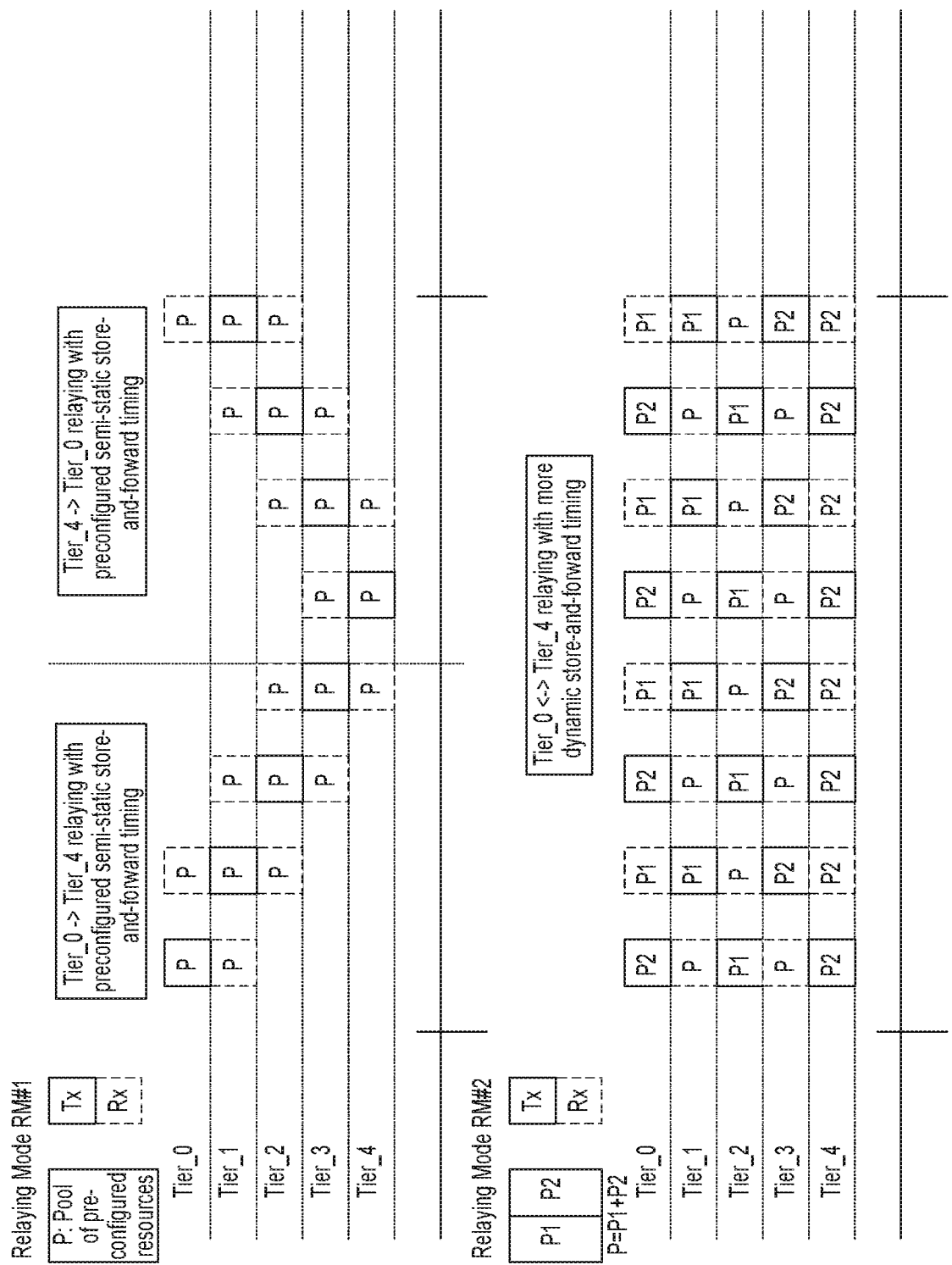
FIG. 3 illustrates an example of some relaying modes and corresponding arrangements of Tx and Rx occasions and resources, according to some embodiments.

FIG. 3 illustrates an example of some relaying modes and corresponding arrangements of Tx and Rx occasions and resources, according to certain embodiments. It is noted that resource pool corresponding to exclusive time-division Tx and Rx occasions can be fully reused across the tiers, as illustrated in RM #1 of FIG. 3 for example. In this option, the time distance between 2 consecutive transmission occasions on a Tier_k may be dependent of the absolute value of k and the preconfigured maximum number of tiers N. However, this is not the case in the arrangement of RM #2 as also shown in FIG. 3. In RM #2, the resource pool is divided into two exclusive sub-pools and reused across the tiers depending on first/last and/or odd/even indexes of individual tiers. Rx pool, P, of Tier_k, other than Tier_0 and Tier_N, is comprised of Tx pools, P1 and P2, of Tier_(k−1) and Tier_(k+1) and Tx and Rx occasions are interchanged or swapped between two consecutive tiers. P1 and P2 division is done to avoid collision between Tier_(k−1) and Tier_(k+1), as seen from SL reception at Tier_k. The pool division in RM #2 may be flexible, either common across all tiers or specific to individual tier.

Having a set of different RM, each associated with or mapped on a preconfigured arrangement of Tx and Rx occasions and resources, as well as relaying profile, allows for an efficient adaptation to different tracking applications and use case scenarios thereof.

It is further noted that the application layer may preconfigure the options for out-of-coverage operation and let the serving network control the selection or reselection of which option to be used via UE in Tier_0. The application server, based on received alive messages from individual UE devices coupled with corresponding relaying contexts of individual UE devices, such as which tier an individual UE is belonging to and through which UE(s) in Tier_0 an individual UE can be reached, may be able to ping an individual UE via associated relaying UE(s) in Tier_0.

In one embodiment, Tier_0 can be a part of the serving network and in this case UE devices of Tier_0 may not be actual tracking-application devices and therefore not be imposed by the strict power-efficiency requirements of the tracking application devices. In this embodiment, Tier_0 may be fully operated and controlled by the serving network for supporting the tracking application of interest, according to provided service profiles and requirements from the application server via the Application Function (AF) and Policy and Charging Control Function (PCF). In some embodiments, UE devices of Tier_0 may be embedded into local access points or base stations, similar to flexible roadside units (RSU) in a V2X framework. This deployment allows for the support of the tracking application fully relying on SL and not Uu. This means that UE devices of the tracking application do not need to be equipped with cellular access capability and therefore become cheaper and less-power consuming.

Furthermore, in one embodiment, a UE of the tracking application may initially be trying to find a suitable relaying UE first, instead of finding a serving network. In case the UE does not discover any relaying UE in its proximity, the UE may start to find a suitable serving network and then to act as Tier_0 UE. In one embodiment, the serving network, upon receiving a service request from a server or a UE of the tracking application—the service request may indicate a targeted service area or a location information of the requesting UE, may select and configure one or more UEs in the targeted service area or in the proximity of the requesting UE to act as Tier_0 UE(s) for the requesting UE. The serving network may then indicate to the requesting UE or the requesting server that Tier_0 is provided. The requesting UE may then release the cellular access connection, discover Tier_0 UE(s) and then deactivate its cellular access capability towards the serving network and act as Tier_1 UE, according to some embodiments presented above. In case the serving network provides also the resource pool configurations for the relaying system via the selected UEs acting as Tier_0 UEs, the serving network may select and configure RM, in addition to setting SFN, HFN and other timing parameters to the selected UEs. Having the serving network to provide Tier_0 for the relaying system of the tracking application allows for the UE devices of the tracking application to have unified UE capabilities and behaviors with regard to the relaying operation and power consumption.

FIG. 4(*a*) illustrates an apparatus 10 according to an example embodiment. In an embodiment, apparatus 10 may be a node or element in a communications network or associated with such a network, such as a UE, mobile equipment (ME), mobile station, mobile device, stationary device, IoT device, or other device. As described herein, UE may alternatively be referred to as, for example, a mobile station, mobile equipment, mobile unit, mobile device, user device, subscriber station, wireless terminal, tablet, smart phone, IoT device, sensor or NB-IoT device, or the like. As one example, apparatus 10 may be implemented in, for instance, a wireless handheld device, a wireless plug-in accessory, or the like.

In some example embodiments, apparatus 10 may include one or more processors, one or more computer-readable storage medium (for example, memory, storage, or the like), one or more radio access components (for example, a modem, a transceiver, or the like), and/or a user interface. In some embodiments, apparatus 10 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 10 may include components or features not shown in FIG. 4(a).

Figure 4A:
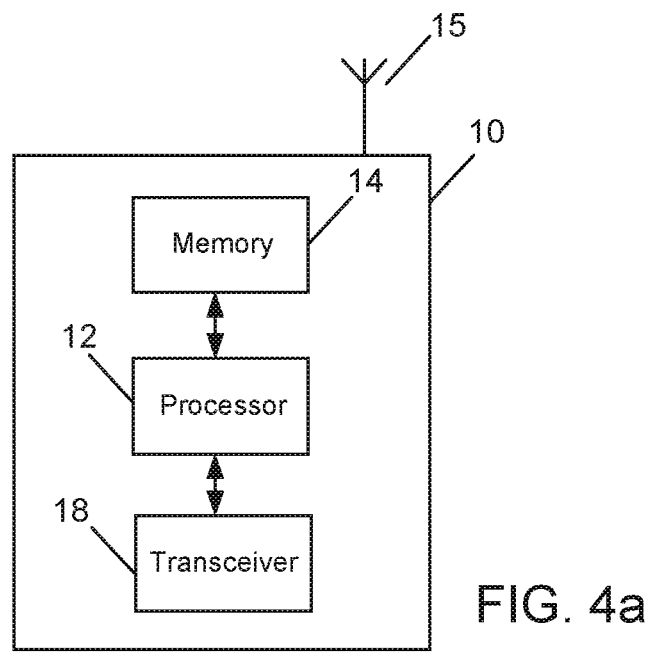
FIG. 4(a) illustrates an example block diagram of an apparatus, according to an embodiment.

As illustrated in the example of FIG. 4(a), apparatus 10 may include or be coupled to a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 4(a), multiple processors may be utilized according to other embodiments. For example, it should be understood that, in certain example embodiments, apparatus 10 may include two or more processors that may form a multiprocessor system (e.g., in this case processor 12 may represent a multiprocessor) that may support multiprocessing. According to certain example embodiments, the multiprocessor system may be tightly coupled or loosely coupled (e.g., to form a computer cluster).

Processor 12 may perform functions associated with the operation of apparatus 10 including, as some examples, precoding of antenna gain/phase parameters, encoding and decoding of individual bits forming a communication message, formatting of information, and overall control of the apparatus 10, including the process illustrated in FIG. 2.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10 to perform at least any of the procedures illustrated in FIG. 2.

In some embodiments, apparatus 10 may also include or be coupled to one or more antennas 15 for receiving a downlink signal and for transmitting via an uplink from apparatus 10. Apparatus 10 may further include a transceiver 18 configured to transmit and receive information. The transceiver 18 may also include a radio interface (e.g., a modem) coupled to the antenna 15. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device). In certain embodiments, apparatus 10 may further include a user interface, such as a graphical user interface or touchscreen.

In an embodiment, memory 14 stores software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software. According to an example embodiment, apparatus 10 may optionally be configured to communicate with apparatus 20 discussed below or other UEs via a wireless or wired communications link 70 according to any radio access technology, such as NR. For example, link 70 may represent a sidelink or Uu interface, for example.

According to certain example embodiments, processor 12 and memory 14 may be included in or may form a part of processing circuitry or control circuitry. In addition, in some embodiments, transceiver 18 may be included in or may form a part of transceiving circuitry.

As discussed above, according to certain example embodiments, apparatus 10 may be a UE, such as an IoT UE and/or tracking device, for example. According to certain embodiments, apparatus 10 may be controlled by memory 14 and processor 12 to perform the functions associated with example embodiments described herein. For instance, in one embodiment, apparatus 10 may be controlled by memory 14 and processor 12 to perform a process for sidelink (SL) based multi-hop UE relaying to support tracking applications, such as the process illustrated in FIG. 2 discussed above.

According to certain embodiments, apparatus 10 may be controlled by memory 14 and processor 12 to determine whether the apparatus 10 is in coverage of a serving network (e.g., 5G or LTE network). If it is determined that the apparatus 10 is in coverage of a serving network, then apparatus 10 may be controlled by memory 14 and processor 12 to connect to the serving network and the application server for the SL based multi-hop relaying of interest, determine that the apparatus 10 belongs to Tier_0 of the SL based multi-hop UE relaying, and determine at least one of the relaying mode and arrangement of Tx and Rx occasions depending on the determined tier, and resources behind the SL based multi-hop UE relaying, as configured by the serving network or the application server.

If it is determined that the apparatus 10 is not in coverage of a serving network, apparatus 10 may be controlled by memory 14 and processor 12 to find other local D2D UEs in proximity of the SL based multi-hop UE relaying of interest. Then, based on finding other D2D UE in proximity, apparatus 10 may be controlled by memory 14 and processor 12 to determine which tier (i.e., Tier_k) out of a plurality of preconfigured tiers 0 to N (Tier_0, . . . , Tier_N) of the SL based multi-hop relaying the apparatus 10 belongs to, and to determine the relaying mode and arrangement of Tx and Rx occasions and resources behind the SL based multi-hop UE relaying for the apparatus 10.

If the apparatus 10 does not discover any other D2D UEs in proximity, then apparatus 10 may be controlled by memory 14 and processor 12 to repeat the above procedures. Otherwise, after determining the tier that the apparatus 10 belongs to, apparatus 10 may be controlled by memory 14 and processor 12 to determine whether the tier that the apparatus 10 belongs to is the highest tier. If it is determined that the tier that the apparatus 10 belongs to is not the highest tier, then apparatus 10 may be controlled by memory 14 and processor 12 to act as a synchronization source for the SL based multi-hop UE relaying and send a control message periodically on a predefined SL control channel configured for the SL based multi-hop UE relaying. In an embodiment, the control message may indicate the tier the apparatus 10 belongs to and the relaying mode of the SL based multi-hop UE relaying. According to one embodiment, apparatus 10 may then be controlled by memory 14 and processor 12 to perform Tx and Rx operations for the application and the SL based multi-hop UE relaying on the corresponding Tx and Rx occasions.

If it is determined that the tier that the apparatus 10 belongs to is the highest tier, then apparatus 10 may be controlled by memory 14 and processor 12 to perform Tx and Rx operations for the application and the SL based multi-hop UE relaying on the corresponding Tx and Rx occasions.

In some embodiments, apparatus 10 may be controlled by memory 14 and processor 12 to initially try to locate a suitable relaying UE first, instead of locating a serving network. When apparatus 10 does not discover any relaying UE in its proximity, apparatus 10 may be controlled by memory 14 and processor 12 to start to find a suitable serving network and then to act as Tier_0 UE.

In another embodiment, the serving network, upon receiving a service request from a server or apparatus 10, where the service request may indicate a targeted service area or a location information of the requesting UE, may select and configure one or more UEs in the targeted service area or in the proximity of apparatus 10 to act as Tier_0 UE(s) for the apparatus 10. In an embodiment, apparatus 10 may be controlled by memory 14 and processor 12 to receive from the serving network an indication that Tier_0 is provided. In an embodiment, apparatus 10 may then be controlled by memory 14 and processor 12 to release the cellular access connection, discover Tier_0 UE(s) and then deactivate its cellular access capability towards the serving network and act as Tier_1 UE. In an embodiment, when the serving network provides also the resource pool configurations for the relaying system via the selected UEs acting as Tier_0 UEs, the serving network may select and configure RM, in addition to setting SFN, HFN and other timing parameters to the selected UEs.

Figure 4B:
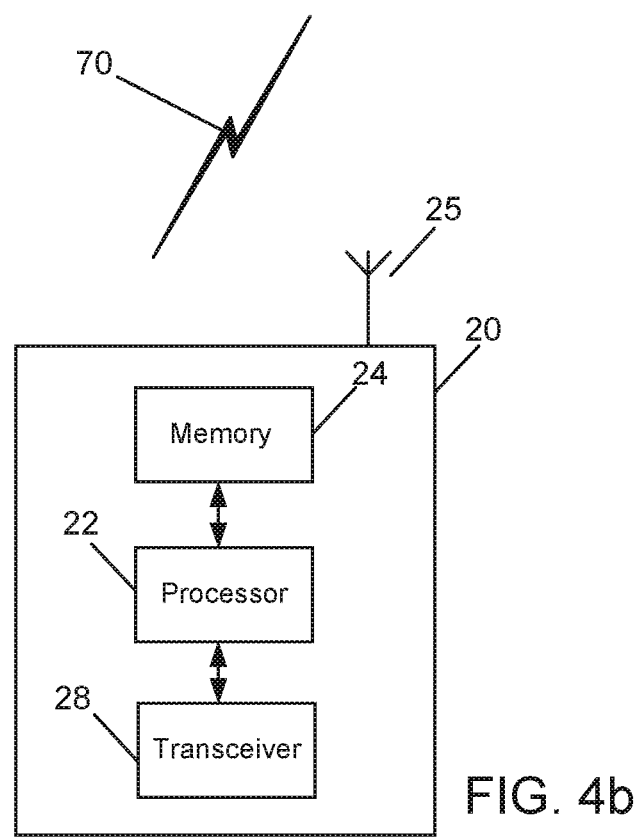
FIG. 4(b) illustrates an example block diagram of an apparatus, according to an embodiment.

FIG. 4(b) illustrates an apparatus 20 according to an example embodiment. In an example embodiment, the apparatus 20 may be a radio resource manager, RAT, node, host, or server in a communication network or serving such a network. For example, apparatus 20 may be a satellite, base station, a Node B, an evolved Node B (eNB), 5G Node B or access point, next generation Node B (NG-NB or gNB), and/or WLAN access point, associated with a radio access network (RAN), such as an LTE network, 5G or NR. It should be noted that one of ordinary skill in the art would understand that apparatus 20 may include components or features not shown in FIG. 4(b).

As illustrated in the example of FIG. 4(b), apparatus 20 may include a processor 22 for processing information and executing instructions or operations. Processor 22 may be any type of general or specific purpose processor. For example, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 4(b), multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster.

According to certain example embodiments, processor 22 may perform functions associated with the operation of apparatus 20, which may include, for example, precoding of antenna gain/phase parameters, encoding and decoding of individual bits forming a communication message, formatting of information, and overall control of the apparatus 20, including processes illustrated in FIG. 2.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20 to perform at least the methods illustrated in FIG. 2.

In certain example embodiments, apparatus 20 may also include or be coupled to one or more antennas 25 for transmitting and receiving signals and/or data to and from apparatus 20. Apparatus 20 may further include or be coupled to a transceiver 28 configured to transmit and receive information. The transceiver 28 may include, for example, a plurality of radio interfaces that may be coupled to the antenna(s) 25. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 28 may be configured to modulate information on to a carrier waveform for transmission by the antenna(s) 25 and demodulate information received via the antenna(s) 25 for further processing by other elements of apparatus 20. In other embodiments, transceiver 18 may be capable of transmitting and receiving signals or data directly. Additionally or alternatively, in some embodiments, apparatus 20 may include an input and/or output device (I/O device).

In an embodiment, memory 24 may store software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

According to some embodiments, processor 22 and memory 24 may be included in or may form a part of processing circuitry or control circuitry. In addition, in some embodiments, transceiver 28 may be included in or may form a part of transceiving circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10 and 20) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 20 may be a radio resource manager, RAT, node, host, or server in a communication network or serving such a network. For example, apparatus 20 may be a satellite, base station, a Node B, an evolved Node B (eNB), 5G Node B or access point, next generation Node B (NG-NB or gNB), and/or WLAN access point, associated with a radio access network (RAN), such as an LTE network, 5G or NR. According to certain embodiments, apparatus 20 may be controlled by memory 24 and processor 22 to perform the functions associated with any of the example embodiments described herein.

Therefore, certain example embodiments provide several technological improvements, enhancements, and/or advantages over existing technological processes and constitute an improvement at least to the technological field of wireless network control and management. For example, certain embodiments improve the reachability of out-of-coverage UEs in a SL based multi-hop UE relaying, as well as improving energy efficiency and reducing UE battery consumption. Accordingly, the use of certain example embodiments results in improved functioning of communications networks and their nodes, such as base stations, eNBs, gNBs, and/or UEs or mobile stations.

In some example embodiments, the functionality of any of the methods, processes, signaling diagrams, algorithms or flow charts described herein may be implemented by software and/or computer program code or portions of code stored in memory or other computer readable or tangible media, and executed by a processor.

In some example embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and may include program instructions to perform particular tasks.

A computer program product may include one or more computer-executable components which, when the program is run, are configured to carry out some example embodiments. The one or more computer-executable components may be at least one software code or portions of code. Modifications and configurations required for implementing functionality of an example embodiment may be performed as routine(s), which may be implemented as added or updated software routine(s). In one example, software routine(s) may be downloaded into the apparatus.

As an example, software or computer program code or portions of code may be in source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus, for example through the use of an application specific integrated circuit (ASIC), a programmable gate array (PGA), a field programmable gate array (FPGA), or any other combination of hardware and software. In yet another example embodiment, the functionality may be implemented as a signal, such as a non-tangible means, that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

One having ordinary skill in the art will readily understand that the example embodiments as discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

A first embodiment may be directed to a method that may include a UE determining which tier of a SL based UE relaying the UE belongs to. The method may also include determining at least a relaying mode and arrangement of transmit and receive occasions for SL transmission and reception in dependence on the determined tier. The method may then include performing, on the determined transmit and receive occasions, transmit and receive operations for the SL based UE relaying.

In a variant, the method may further include the UE acting as a synchronization source for other UEs in the SL based UE relaying. In a variant, the method may also include the UE periodically sending a control message on a predefined SL control channel configured for the SL based UE relaying, where the SL control message may indicate the tier that the UE belongs to and the relaying mode of the SL based UE relaying.

In a variant, the determining of which tier the UE belongs to further includes discovering whether there are other UEs in proximity of the UE and determining which tier the other UEs belong to.

In a variant, when the UE is in a coverage area of a serving network, the method may include connecting to the serving network and an application server for the SL based UE relaying, determining that the UE belongs to a lowest tier (Tier_0) of the SL based UE relaying, and determining the relaying mode and arrangement of transmit and receive occasions for SL transmission as configured by the serving network or the application server.

In another variant, the UE may initially try to locate a suitable relaying UE first, instead of locating a serving network. When the UE does not discover any relaying UE in its proximity, the UE may start to find a suitable serving network and then to act as Tier_0 UE.

In another variant, the serving network, upon receiving a service request from a server or a UE of the tracking application, where the service request may indicate a targeted service area or a location information of the requesting UE, may select and configure one or more UEs in the targeted service area or in the proximity of the requesting UE to act as Tier_0 UE(s) for the requesting UE. In a variant, the serving network may indicate to the requesting UE or the requesting server that Tier_0 is provided. In a variant, the requesting UE may then release the cellular access connection, discover Tier_0 UE(s) and then deactivate its cellular access capability towards the serving network and act as Tier_1 UE. In a variant, when the serving network provides also the resource pool configurations for the relaying system via the selected UEs acting as Tier_0 UEs, the serving network may select and configure RM, in addition to setting SFN, HFN and other timing parameters to the selected UEs.

A second embodiment is directed to an apparatus including at least one processor and at least one memory comprising computer program code. The at least one memory and computer program code may be configured, with the at least one processor, to cause the apparatus at least to perform the method according to the first embodiment, or any of the variants described above.

A third embodiment is directed to an apparatus that may include circuitry configured to perform the method according to the first embodiment, or any of the variants described above.

A fourth embodiment is directed to an apparatus that may include means for performing the method according to the first embodiment, or any of the variants described above.

A fifth embodiment is directed to a non-transitory computer readable medium comprising program instructions stored thereon for performing at least the method according to the first embodiment, or any of the variants described above.

We claim:

1. A method, comprising:
    determining, at a user equipment, to which tier of a sidelink based multi-hop user equipment relaying the user equipment belongs and a relaying mode for the sidelink based multi-hop user equipment relaying;
    determining an arrangement of transmit and receive occasions for sidelink transmission and reception for the sidelink based multi-hop user equipment relaying in dependence on the determined tier that the user equipment belongs to and the relaying mode, wherein the arrangement of transmit and receive occasions is specific to the determined tier that the user equipment belongs to; and
    performing, on the determined transmit and receive occasions, transmit and receive operations for the sidelink based multi-hop user equipment relaying based on the determined arrangement,
    the method further comprising:
    attempting, by the user equipment, to first discover a relaying user equipment of the sidelink based multi-hop user equipment relaying in its proximity, instead of discovering a serving network;
    when the user equipment discovers a relaying user equipment of the sidelink based multi-hop user equipment relaying in its proximity, acting as a higher tier user equipment of the sidelink based multi-hop user equipment relaying in dependence on the tier of the user equipment discovered; and
    when the user equipment does not discover a relaying user equipment of the sidelink based multi-hop user equipment relaying in its proximity, starting to discover and select a serving network and acting as a lowest tier user equipment of the sidelink based multi-hop user equipment relaying.

2. The method according to claim 1, comprising by the user equipment acting as a synchronization source for one or more other user equipments in the sidelink based multi-hop user equipment relaying in dependence on the determined tier that the user equipment belongs to.

3. The method according to claim 1, comprising periodically sending, by the user equipment, a control message on a predefined sidelink channel configured for the sidelink based multi-hop user equipment relaying, wherein the control message indicates at least one of the tier that the user equipment belongs to and the relaying mode of the sidelink based multi-hop user equipment relaying.

4. The method according to claim 1, wherein the determining of which tier the user equipment belongs to comprises discovering whether there are one or more other user equipments of the sidelink based multi-hop user equipment relaying in proximity of the user equipment and determining which tier the one or more other user equipments belong to.

5. The method according to claim 1, wherein, when the user equipment is in a coverage area of a serving network, the method comprises:
  connecting to at least one of the serving network and an application server for the sidelink based multi-hop user equipment relaying;
  determining that the user equipment belongs to a lowest tier of the sidelink based multi-hop user equipment relaying; and
  determining the relaying mode and arrangement of transmit and receive occasions for sidelink transmission as configured by the serving network or the application server.

6. The method according to claim 1, comprising:
  transmitting a service request to the serving network, wherein the service request indicates a targeted service area or a location information of the user equipment.

7. The method according to claim 6, further comprising receiving an indication from the serving network that a lowest tier user equipment of the sidelink based multi-hop user equipment relaying is provided for the user equipment.

8. The method according to claim 7, further comprising:
  discovering the lowest tier user equipment of the sidelink based multi-hop user equipment relaying;
  deactivating cellular access capability towards the serving network in case one or more user equipments of the sidelink based multi-hop user equipment relaying are discovered; and
  acting as a higher tier user equipment of the sidelink based multi-hop user equipment relaying compared to the lowest tier of the one or more user equipments discovered.

9. An apparatus, comprising:
  at least one processor; and
  at least one memory comprising computer program code,
  the at least one memory and computer program code configured, with the at least one processor, to cause the apparatus at least to:
    determine which tier of a sidelink based multi-hop user equipment relaying the apparatus belongs to and a relaying mode for the sidelink based multi-hop user equipment relaying;
    determine an arrangement of transmit and receive occasions for sidelink transmission and reception for the sidelink based multi-hop user equipment relaying in dependence on the determined tier that the apparatus belongs to and the relaying mode, wherein the arrangement of transmit and receive occasions is specific to the determined tier that the apparatus belongs to; and
    perform, on the determined transmit and receive occasions, transmit and receive operations for the sidelink based multi-hop user equipment relaying based on the determined arrangement,
    attempt to first discover a relaying user equipment of the sidelink based multi-hop user equipment relaying in its proximity, instead of discovering a serving network;
    when the apparatus discovers a relaying user equipment of the sidelink based multi-hop user equipment relaying in its proximity, act as a higher tier user equipment of the sidelink based multi-hop user equipment relaying in dependence on the tier of the apparatus discovered; and
    when the apparatus does not discover a relaying user equipment of the sidelink based multi-hop user equipment relaying in its proximity, start to discover and select a serving network and act as a lowest tier user equipment of the sidelink based multi-hop user equipment relaying.

10. The apparatus according to claim 9, wherein the sidelink based multi-hop user equipment relaying comprises a multi-hop relaying of data between at least one source user equipment and at least one destination user equipment or between at least one source user equipment and at least one serving network via at least one relaying user equipment for at least one targeted service and the tier is corresponding to a specific hop of the sidelink based multi-hop user equipment relaying.

11. The apparatus according to claim 9, wherein the at least one memory and computer program code configured, with the at least one processor, to cause the apparatus to act as a synchronization source for one or more other user equipments in the sidelink based multi-hop user equipment relaying in dependence on the determined tier that the apparatus belongs to.

12. The apparatus according to claim 9, wherein the at least one memory and computer program code configured, with the at least one processor, to cause the apparatus to periodically send a control message on a predefined sidelink channel configured for the sidelink based multi-hop user equipment relaying, wherein the control message indicates at least one of the tier that the apparatus belongs to and the relaying mode of the sidelink based multi-hop user equipment relaying.

13. The apparatus according to claim 9, wherein when determining which tier the apparatus belongs to, the at least one memory and computer program code configured, with the at least one processor, to cause the apparatus to discover whether there are one or more other user equipments of the sidelink based multi-hop user equipment relaying in proximity of the apparatus and determine which tier the one or more other user equipments belong to.

14. The apparatus according to claim 9, wherein, when the apparatus is in a coverage area of a serving network, the at least one memory and computer program code configured, with the at least one processor, to cause the apparatus to:
  connect to at least one of the serving network and an application server for the sidelink based multi-hop user equipment relaying;
  determine that the apparatus belongs to a lowest tier of the sidelink based multi-hop user equipment relaying; and
  determine the relaying mode and arrangement of transmit and receive occasions for sidelink transmission as configured by the serving network or the application server.

15. The apparatus according to claim 9, wherein the at least one memory and computer program code configured, with the at least one processor, to cause the apparatus to:
  transmit a service request to the serving network, wherein the service request indicates a targeted service area or a location information of the apparatus.

16. The apparatus according to claim 15, wherein the at least one memory and computer program code configured, with the at least one processor, to cause the apparatus to receive an indication from the serving network that a lowest tier user equipment of the sidelink based multi-hop user equipment relaying is provided for the apparatus.

17. The apparatus according to claim 16, wherein the at least one memory and computer program code configured, with the at least one processor, to cause the apparatus to:
  discover the lowest tier user equipment of the sidelink based multi-hop user equipment relaying;

deactivate cellular access capability towards the serving network in case one or more user equipments of the sidelink based multi-hop user equipment relaying are discovered; and act as a higher tier user equipment of the sidelink based multi-hop user equipment relaying compared to the lowest tier of the one or more user equipments discovered.

18. An apparatus, comprising:

at least one processor; and at least one memory comprising computer program code, the at least one memory and computer program code configured, with the at least one processor, to cause the apparatus at least to:

receive a service request from a first user equipment or a server, wherein the service request indicates a targeted service area or a location information of the first user equipment for a sidelink based multi-hop user equipment relaying;

configure a second user equipment in the targeted service area or in proximity of the first user equipment to act as a lowest tier user equipment of the sidelink based multi-hop user equipment relaying for the first user equipment;

indicate to the first user equipment or the server that the lowest tier user equipment of the sidelink based multi-hop user equipment relaying is provided for the first user equipment; and configure a relaying mode, setting a system frame number and a hyper frame number to the configured second user equipment.

* * * * *